3,258,453
RECOVERY PROCESS INCORPORATING STEP OF TREATING POLYMER WITH A SURFACTANT
Henry K. Chi, Longmeadow, Mass., assignor to Monsanto Company, a corporation of Delaware
No Drawing. Filed Nov. 18, 1963, Ser. No. 324,194
12 Claims. (Cl. 260—82.1)

This invention relates to a process for recovering polymer beads from an aqueous slurry and more particularly relates to a process for more completely decontaminating polymer beads during recovery from an aqueous slurry.

Suspension, or bead, polymerization, one of the techniques advantageously employed in the commercial production of many polymers, results in the formation of an aqueous slurry of polymer beads, which are conventionally recovered by dewatering the slurry and washing and drying the beads. As is well known, conventional recovery techniques remove the major amount of contaminants, such as water, suspending agent, and other polymerization adjuvants, but usually leave the polymer beads sufficiently contaminated, e.g., with suspending agent, to have an adverse effect on the optical clarity and color of the polymer and—in the case of water-soluble suspending agents—the hydrogroscopicity of the polymer.

An object of the invention is to provide a novel process for recovering polymer beads from an aqueous slurry.

Another object is to provide a process for more completely decontaminating polymer beads during recovery from an aqueous slurry.

Another object is to improve the optical clarity of polymers prepared by suspension polymerization.

A further object is to decrease the hygroscopicity of polymers prepared by suspension polymerization in the presence of water-soluble suspending agents.

These and other objects are attained by adding about 0.001–1% of a surfactant, based on the weight of the polymer beads, prior to completing the washing step of an otherwise conventional process for recovering polymer beads from an aqueous slurry by dewatering the slurry and washing and drying the beads.

The following examples are given to illustrate the invention and are not intended as a limitation thereof. Unless otherwise specified, quantities mentioned are quantities by weight.

EXAMPLE I.—CONTROL

*Part A*

Prepare an aqueous slurry of polymer beads from the following polymerization recipe:

| Ingredient: | Parts |
|---|---|
| Water | 100 |
| Styrene | 100 |
| Sodium chloride | .01 |
| Peroxy catalyst | 0.05 |
| Suspending agent* | 0.05 |
| Chelating agent ** | 0.0003 |
| Blue dye | 0.00006 |

*An acrylic acid/2-ethylhexyl acrylate copolymer containing 95 mol percent of combined acrylic acid and having a specific viscosity of 3.5, measured as a 1% aqueous solution of the copolymer at 25° C.
**Pentasodium salt of diethylenetriamine pentaacetic acid.

Charge all the ingredients except the suspending agent and sodium chloride to a suitable reaction vessel. Purge with nitrogen. Heat at 90–140° C. to the stage of about 20% conversion, add the suspending agent, continue heating to the stage of about 40% conversion, add the sodium chloride, and continue heating at temperatures up to 150° C. to the stage of substantially complete conversion. Cool the slurry to 80° C.

*Part B*

Transfer the slurry to a slurry hold tank containing an aqueous solution of about 0.02 part of sodium hydroxide to adjust the pH to 7.0–8.0. Screen the slurry to dewater it and separate emulsion polymer and most of the water-soluble contaminants from the beads. Then wash the beads with about 200 parts of water to effect further decontamination, centrifuge, and dry the beads in a parallel current rotary drier.

*Part C*

Blend the beads with 0.05 part of polyethylene glycol 400, extrude at 248–260° C., and injection mold the extruded pellets at about 288° C. to form test specimens having a thickness of 0.15 inch. Test the optical clarity of the specimens by measuring the total transmission ($T_t$) and diffuse transmission ($T_d$) of light having a wave length of 420 mu and calculating the haze value by the equation:

$$\text{Haze} = \frac{T_d \times 100}{T_t}$$

The polymer has a haze of 1.6%.

EXAMPLE II

Repeat Example I except for mixing the slurry with 0.03 part of a cationic surfactant—an ethylene oxide/primary fatty amine condensate—while adjusting the pH in the slurry hold tank. The recovered polymer has a haze of 1.1%: 31% lower than the haze of the control.

EXAMPLE III

Repeat Example I except for mixing the slurry with 0.03 part of an anionic surfactant—dioctyl sodium sulfosuccinate—while adjusting the pH in the slurry hold tank. The recovered polymer has a haze of 0.9%: 44% lower than the haze of the control.

EXAMPLE IV

Repeat Example I except for mixing the slurry with 0.03 part of a non-ionic surfactant—isooctylphenoxypolyoxyethylene ethanol—while adjusting the pH in the slurry hold tank. The recovered polymer has a haze of 1.0%: 38% lower than the haze of the control.

EXAMPLE V

Repeat Example I except for mixing the slurry with 0.03 part of a non-ionic surfactant—an ethylene oxide/polyoxypropylene glycol condensate—while adjusting the pH in the slurry hold tank. The recovered polymer has a haze of 0.8: 50% lower than the haze of the control.

EXAMPLE VI.—CONTROL

Part A

Prepare an aqueous slurry of polymer beads from the following polymerization recipe:

| Ingredient: | Parts |
| --- | --- |
| Water | 100 |
| Styrene | 100 |
| Sodium chloride | 0.1 |
| Peroxy catalyst | 0.09 |
| Suspending agent* | 0.05 |
| Chelating agent** | 0.0003 |
| Blue dye | 0.00006 |

*An acrylic acid/2-ethylhexyl acrylate copolymer containing 95 mol percent of combined acrylic acid and having a specific viscosity of 3.5, measured as a 1% aqueous solution of the copolymer at 25° C.
**Pentasodium salt of diethylenetriamine pentaacetic acid.

Charge all the ingredients except the suspending agent and sodium chloride to a suitable reaction vessel. Purge with nitrogen. Heat at 8–120° C. to the stage of about 20% conversion, add the suspending agent, continue heating to the stage of about 40% conversion, add the sodium chloride, and continue heating at temperatures up to 150° C. to the stage of substantially complete conversion. Cool the slurry to 80° C.

Part B

Transfer the slurry to a slurry hold tank containing an aqueous solution of about 0.02 part of sodium hydroxide to adjust the pH to 7.0–8.0. Screen the slurry to dewater it and separate emulsion polymer and most of the water-soluble contaminants from the beads. Then wash the beads with about 200 parts of water to effect further decontamination, centrifuge, and dry the beads in a parallel current rotary drier.

Part C

Blend the beads with 0.05 part of polyethylene glycol 400, extrude at 248–260° C., and injection mold the extruded pellets at about 288° C. to form test specimens having a thickness of 0.15 inch. Test the optical clarity of the specimens by measuring the total transmission ($T_t$) and diffuse transmission ($T_d$) of light having a wave length of 420 mu and calculating the haze value by the equation:

$$\text{Haze} = \frac{T_d \times 100}{T_t}$$

The polymer has a haze of 1.7%.

EXAMPLE VII

Repeat Example VI except for mixing the slurry with 0.004 part of a surface-active ethylene oxide/polyoxypropylene glycol condensate while adjusting the pH in the slurry hold tank. The recovered polymer has a haze of 1.1%: 35% lower than the haze of the control.

EXAMPLE VIII

Repeat Example VI except for mixing the slurry with 0.03 part of a surface-active ethylene oxide/polyoxypropylene glycol condensate while adjusting the pH in the slurry hold tank. The recovered polymer has a haze of 0.9%: 47% lower than the haze of the control.

EXAMPLE IX

Repeat Example VI except for mixing the slurry with 0.2 part of a surface-active ethylene oxide/polyoxypropylene glycol condensate while adjusting the pH in the slurry hold tank. The recovered polymer has a haze of 0.9%: 47% lower than the haze of the control.

EXAMPLE X

Repeat Example VI except for mixing the slurry with 1.0 part of a surface-active ethylene oxide/polyoxypropylene glycol condensate while adjusting the pH in the slurry hold tank. The recovered polymer has a haze of 1.2%: 29% lower than the haze of the control.

As demonstrated in the preceding examples, considerable reductions in haze are achieved when a small amount of a surfactant is added to an aqueous slurry of polymer beads prior to dewatering the slurry and washing and drying the beads. Similar results are observed when:

(1) The polymer beads being recovered are beads of polyvinyl chloride, polyvinyl acetate, polymethyl methacrylate, polyvinylidene chloride, a styrene/acrylonitrile (80:20) copolymer, a styrene/alpha-methylstyrene/acrylonitrile (50:25:25) terpolymer, or a styrene/methyl methacrylate (85:15) copolymer, (2) The surfactant is cetyltrimethylammonium bromide, polyvinylpyrrolidone, sodium oleate, sodium N-methyl-N-oleyl taurate, sulfated castor oil, sodium di(2-ethylhexyl)phosphate, glycerol monostearate, lauric diethanolamide, sorbitan monolaurate, polyoxyethylene glycol dioleate, or polyoxyethylene-oxypropylene glycol stearate, (3) The surfactant is added with the wash water instead of being added prior to dewatering the aqueous slurry, and (4) The suspending agent used in preparing the slurry is zinc oxide, magnesium hydroxide, kieselguhr, barium phosphate, tricalcium phosphate, ferric carbonate, polyvinyl alcohol, polyacrylic acid, a water-soluble acrylic acid/n-dodecyl acrylate copolymer, a water-soluble methacrylic acid/hexyl acrylate copolymer, a water-soluble sodium salt of sulfonated polystyrene, or a water-soluble vinyl acetate/maleic anhydride copolymer.

The polymers prepared in the presence of water-soluble suspending agents and recovered in accordance with the present invention, in addition to having improved optical clarity, are less hygroscopic than the control polymers. The following example demonstrates another advantage of the invention: the effectiveness of some of the surfactants in improving the color of the polymer.

EXAMPLE XI

Measure the reflectance of light of an Example I test specimen and an Example VIII test specimen at 585 mu, 500 mu, and 420 mu, and calculate the three-point yellowness of each of the specimens by the equation:

$$3PY = 2R_{585} - (R_{500} + R_{420})$$

wherein 3PY represents the three-point yellowness value and $R_{585}$, $R_{500}$, and $R_{420}$ represent the reflectances at 585 mu, 500 mu, and 420 mu, respectively. The Example I specimen (no surfactant used during the recovery process) has a three-point yellowness of 2.6; the Example VIII specimen (0.03 part of a surface-active ethylene oxide/polyoxypropylene glycol condensate added during the recovery process) has a three-point yellowness of 1.6: a 38% decrease in yellowness.

As indicated above, the present invention is applicable to the recovery of polymer beads from an aqueous slurry, regardless of the particular nature of the polymer or the suspending agent used in preparing the polymer slurry. Thus, in the practice of the invention, beads of a polymer of any suspension-polymerizable monomer or mixture of monomers can be recovered from an aqueous slurry prepared in the presence of any water-soluble or water-insoluble suspending agent.

Exemplary of suspension-polymerizable monomer charges are vinyl halides such as vinyl chloride, vinyl bromide, etc.; vinylidene halides such as vinylidene chloride, vinylidene bromide, etc.; vinyl esters such as vinyl acetate, vinyl propionate, etc.; alkyl (alk)acrylates such as methyl (meth)acrylate, ethyl (meth)acrylate, butyl (meth)acrylate, etc.; conjugated 1,3-dienes such as butadiene, isoprene, etc.; monovinylidene aromatic monomers such as styrene, o-, m-, and p-methylstyrenes, p-t-butylstyrene, ar-diethylstyrenes, and other ar-alkylstyrenes, alpha-methylstyrene, alpha-ethylstyrene, alpha-methyl-p- methylstyrene, and other alpha-alkylstyrenes, o-, m-, and p-chlorostyrenes, ar-dibromostyrenes, and other ar-halostyrenes, vinyl naphthalene, etc.; and mixtures thereof with one another and/or with one or more copolymerizable monomers such as a dialkyl maleate or fumarate, e.g., dimethyl maleate, diethyl maleate, dibutyl maleate, the corresponding fumarates, etc.; an alpha, beta-unsaturated monobasic acid or derivative thereof, e.g., (meth)acrylic acid, (meth)acrylonitrile, (meth)acrylamide, N-t-butyl (meth)acrylamide and other N-alkyl (meth)acrylamides, etc.

Among the water-soluble and water-insoluble suspending agents used in preparing bead polymers are calcium, barium, and magnesium phosphates; aluminum and magnesium hydroxides; calcium, ferric, and magnesium carbonates; zinc sulfide; calcium fluoride; magnesium silicate; barium sulfate; zinc oxide; talc; kaolin; kieselguhr; polyvinyl alcohol; cellulose ethers such as methoxycellulose, sodium carboxymethylcellulose, etc.; water-soluble sulfonated polystyrenes and the alkali metal and ammonium salts thereof; water-soluble vinyl acetate/maleic anhydride copolymers; polyacrylic acid; water-soluble copolymers of acrylic acids such as water-soluble acrylic acid/2-ethylhexyl acrylate copolymers, water-soluble acrylic acid/n-dodecyl acrylate copolymers, water-soluble methacrylic acid/hexyl acrylate copolymers, and other water-soluble interpolymers of acrylic acid and/or methacrylic acid with a $C_6$–$C_{18}$ alkyl acrylate and/or a $C_6$–$C_{18}$ alkyl methacrylate, etc.

A preferred embodiment of the invention is its use in recovering polymer beads, particularly beads of a monovinylidene aromatic hydrocarbon polymer, from an aqueous slurry containing residual water-soluble suspending agent, such as a (meth)acrylic acid/alkyl (meth)acrylate copolymer, because of the fact that water-soluble suspending agents—in addition to having an adverse effect on the optical clarity of the polymers—contribute undesirable hygroscopicity.

Except when the color of the recovered polymer is a factor to be considered, the surfactant employed in the practice of the invention can be any cationic, anionic, or non-ionic surface-active agent, i.e., a substance which—at the concentrations employed—alters the prevailing interfacial conditions, such as surface tension. When the color of the polymer is an important factor, the surfactant should be anionic or non-ionic, preferably non-ionic. The chemical structures which make materials capable of functioning as surfactants are already well known and are discussed, e.g., in Moilliet & Collie, "Surface Activity," published by D. Van Nostrand Company, Inc. Exemplary of such materials are:

(Cationic) amine and quaternary ammonium compounds such as lauryl pyridinium chloride, N-tallow trimethylenediamine, cetyltrimethylammonium bromide, 1-(2-hydroxyethyl)-2-heptadecenyl-2-imidazoline, polyvinyl pyrrolidone, triethanolamine hydrochloride, ethylene oxide/alkylamine condensates, etc.;

(Anionic) sulfonates such as dioctyl sodium sulfosuccinate, di(2-ethylhexyl) sulfosuccinate, disodium N-octadecylsulfosuccinamate, sodium dodecylbenzene sulfonate, sodium isopropylnaphthalene sulfonate, sodium petroleum sulfonate, sodium lignosulfonate, sodium dodecyl diphenyl ether disulfonate, sodium N-methyl-N-oleyl taurate, monobutylphenyl phenol sodium monosulfonate, etc.; sulfates such as ammonium lauryl sulfate, sodium myristyl sulfate, sodium tetradecyl sulfate, sodium pentadecyl sulfate, sodium octyl sulfate, sulfated glyceryl trioleate, sulfated ricinoleic acid, sulfated castor oil, sulfated cresylic acid, etc.; carboxylates such as oleic acid, sodium oleate, sodium laurate, potassium stearate, calcium oleate, triethanolamine oleate, ethylenediamine tetraacetic acid, trisodium N-(hydroxyethyl)ethylenediamine triacetate, etc.; phosphates such as sodium di-(2-ethylhexyl)phosphate, sodium di-(t-amylphenyl)phosphate, etc.;

(Non-ionic) polyether alcohols such as ethylene oxide/ polyoxypropylene glycol condensates, polyethylene glycol ether of hydroabietyl alcohol, polyethylene glycol ether of rosin, lauryloxypolyoxyethylene ethanol, oleyloxypolyoxyethylene ethanol, stearyloxypolyoxyethylene ethanol, octylphenoxypolyoxyethylene ethanol, isooctylphenoxypolyoxyethylene ethanol, nonylphenoxypolyoxyethylene ethanol, dodecylphenoxypolyoxyethylene ethanol, trimethylnonylphenoxypolyoxyethylene ethanol, tridecyloxypolyoxyethylene ethanol, etc.; fatty esters such as butyl stearate, isopropyl myristate, isopropyl palmitate, ethylene glycol monostearate, diethylene glycol monooleate, the sorbitan mono- and tri-stearates, laurates, oleates, and palmitates, the mono- and di-stearates, laurates, oleates, palmitates, and ricinoleates of propylene glycol, glycerol polyoxyethylene glycol, polyoxyethylene-oxypropylene glycol, methoxy-polyethylene glycol, and polyoxyethylene sorbitol, etc.; amides such as stearamide, terpene lauric amide, the coconut, lauric, oleic, and stearic diethanolamides, the lauric, stearic, and oleic isopropanolamides, polyoxyethylene glycol palmitic amide, etc.

The amount of surfactant employed in the practice of the invention should be in the range of about 0.001–1%, preferably about 0.02–0.2%, based on the weight of the polymer beads. The surfactant must be added prior to the completion of the washing step and is preferably added at the beginning of the washing step, i.e., by dissolving the surfactant in the wash water prior to washing the beads, or—more preferably—prior to dewatering the aqueous slurry. When an acidic or basic solution is used to neutralize the aqueous slurry of polymer beads prior to dewatering, the addition of the surfactant to the beads is conveniently accomplished by dissolving it in this neutralizing solution.

The invention is applicable to the improvement of bead polymer recovery processes conducted by any of the conventional dewatering, washing, and drying techniques. The practice of the invention results in the recovery of polymer beads having improved optical clarity and, in some cases, decreased yellowness and/or decreased hygroscopicity because of more complete decontamination.

It is obvious that many variations can be made in the products and processes set forth above without departing from the spirit and scope of this invention.

What is claimed is:

1. In a process for recovering beads of a polymer of a vinyl halide, vinylidene halide, alkyl acrylate, alkyl methacrylate, conjugated 1,3-diene, monovinylidene aromatic hydrocarbon and/or ar-halostyrene from an aqueous slurry containing a water-soluble interpolymer of (a) acrylic acid /and/or methacrylic acid and (b) a $C_6$–$C_{18}$ alkyl acrylate and/or a $C_6$–$C_{18}$ alkyl methacrylate as a suspending agent by neutralizing and dewatering the slurry and washing and drying the beads, the improvement which comprises adding about 0.001–1% of a non-ionic surfactant, based on the weight of the polymer beads, prior to washing the beads.

2. The process of claim 1 wherein the surfactant is added to the aqueous slurry prior to dewatering.

3. The process of claim 1 wherein the amount of surfactant added is in the range of fabout 0.02–0.2%, based on the weight of the polymer beads.

4. The process of claim 1 wherein the surfactant is an ethylene oxide/polyoxypropylene glycol condensate.

5. The process of claim 1 wherein the polymer is a polymer of a monovinylidene aromatic hydrocarbon.

6. The process of claim 5 wherein the monovinylidene aromatic hydrocarbon polymer is polystyrene.

7. The process of claim 5 wherein the monovinylidene aromatic hydrocarbon polymer is a styrene/acrylonitrile copolymer.

8. In a process for recovering monovinylidene aromatic hydrocarbon polymer beads from an aqueous slurry containing a water-soluble interpolymer of (a) acrylic acid and/or methacrylic acid and (b) a $C_6$–$C_{18}$ alkyl acrylate and/or a $C_6$–$C_{18}$ alkyl methacrylate as a suspending agent by neutralizing and dewatering the slurry and washing and drying the beads, the improvement which comprises adding about 0.001–1% of a non-ionic surfactant, based on the weight of the beads, prior to dewatering the slurry.

9. The process of claim 8 wherein the monovinylidene aromatic hydrocarbon polymer is polystyrene.

10. The process of claim 8 wherein the monovinylidene aromatic hydrocarbon polymer is a styrene/acrylonitrile copolymer.

11. The process of claim 8 wherein the amount of surfactant added is in the range of about 0.02–0.2%, based on the weight of the polymer beads.

12. The process of claim 8 wherein the non-ionic surfactant is an ethylene oxide/polyoxypropylene glycol condensate.

References Cited by the Examiner

UNITED STATES PATENTS

| | | | |
|---|---|---|---|
| 2,934,530 | 4/1960 | Ballast et al. | 260—93.5 |
| 2,948,710 | 8/1960 | D'Alelio et al. | 260—93.5 |
| 3,051,682 | 8/1962 | Ott | 260—85.5 |
| 3,070,588 | 12/1962 | Klink et al. | 260—93.5 |

JOSEPH L. SCHOFER, *Primary Examiner.*

DONALD E. CZAJA, *Examiner.*

H. WONG, *Assistant Examiner.*